(No Model.)

H. M. AMOS.
WATERING DEVICE FOR CHICKENS.

No. 581,952. Patented May 4, 1897.

Witnesses:
L. C. Hills.
A. D. Hough.

Inventor:
Harry M. Amos,
by Franklin N. Hough
Atty.

THE NORRIS PETERS CO., PHOTO-LITHO., WASHINGTON, D. C.

UNITED STATES PATENT OFFICE.

HARRY M. AMOS, OF RAINSBURG, PENNSYLVANIA.

WATERING DEVICE FOR CHICKENS.

SPECIFICATION forming part of Letters Patent No. 581,952, dated May 4, 1897.

Application filed January 15, 1897. Serial No. 619,360. (No model.)

*To all whom it may concern:*

Be it known that I, HARRY M. AMOS, a citizen of the United States, residing at Rainsburg, in the county of Bedford and State of Pennsylvania, have invented certain new and useful Improvements in Watering Devices for Chickens; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in devices adapted for use in watering chickens, and especially to an automatically-regulated fountain by which a supply of water is constantly kept in a dish to which access is had by the beak of the chicken.

A further part of the invention resides in the provision of a watering device of the character described consisting of two parts, one of which, which is provided for a reservoir, is adapted to be held in an inverted position over an apertured base portion, through the apertures in which a hen or chicken may have access to a supply of water, which automatically keeps the base-dish filled as the water is consumed. In connection with the two-part water-fountain I provide a surrounding cylinder, forming an air-space between to protect the contents of the receptacle from heat or cold, as the case may be.

To these ends and to such others as the invention may pertain the same consists, further, in the novel construction, combination, and adaptation of the parts, as will be hereinafter more fully described and then specifically defined in the appended claim.

I clearly illustrate my invention in the accompanying drawings, which, with the letters of reference marked thereon, form a part of this specification, and in which drawings—

Figure 1:
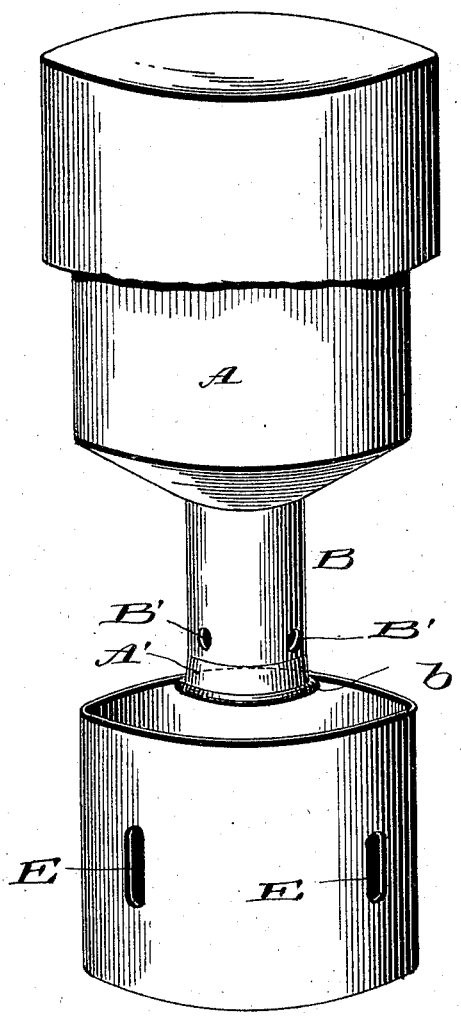
Figure 2:
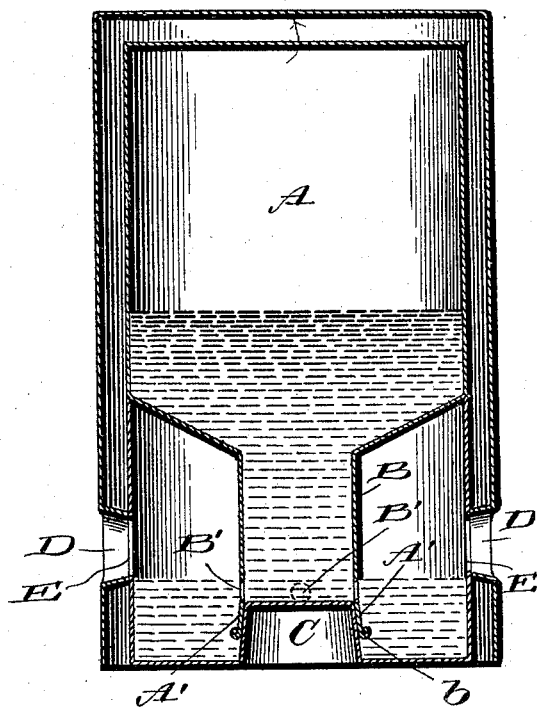
Figure 3:
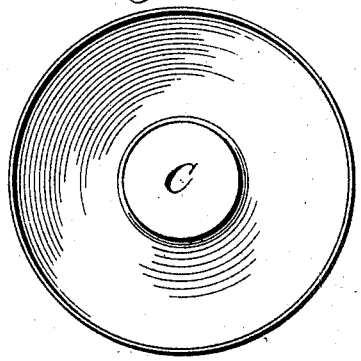

Figure 1 is a perspective view of my watering device, the parts being separated. Fig. 2 is a central longitudinal section of the watering-receptacle. Fig. 3 is a plan view of the base portion, looking down into the same.

Reference now being had to the details of the drawings by letter, A designates the reservoir, which is adapted to hold the supply of water. This receptacle is provided with a neck B, with a flange $b$ at its end, and has a tapering portion A'. The bottom of base portion is of cap shape and near its central portion is a frusto-conical projection C, over which the neck of the receptacle A is adapted to fit, and thus support the receptacle A, while the outer margin of the tapered portion A' of the receptacle is designed to rest on the free edge of the base portion.

About the neck of the receptacle is a series of apertures B', through which water from the reservoir A may pass into the base portion or water-containing dish when the water in the latter is at a height below the upper margin of the said apertures in the side wall of the neck portion.

In order to protect the water in the reservoir from heat or cold, it is my purpose to construct a cylinder open at one end, which is inverted over the watering device and is provided with a series of elongated apertures D, which are located at such positions as to register with the elongated apertures E in the side wall of the base portion. Connecting the apertures thus registering are tubes of a shape corresponding to the shape of the apertures, being soldered or otherwise secured to the outer cylinder, while their inner ends, which are designed to enter the elongated apertures in the side wall of the base portion, are slightly contracted to insure the tubes being securely held in place in the said apertures.

By the provision of the outer cylinder about the watering-receptacle with a slight space intervening the water in cold weather will be kept from freezing, while in warm weather the air-space will have a tendency to keep the water cool.

In operation the receptacle is filled with water, then inverted over the base portion in the manner illustrated in the drawings, and the water will flow out into the cup base portion until the water in the base-cup rises up to the upper margin of the apertures in the neck of the receptacle A, and the hens or chickens are allowed access to the water in the base portion through the elongated apertures, which are connected by the tubes as above described. When the water lowers in the base portion the supply will be replenished automatically, as will be readily understood.

If desired, I may dispense with the outer cylinder, which will render the device less complicated, and when not using the outer cylinder the chickens have access directly with the water through the apertures in the base portion, as the tubes are connected with the outer cylinder.

Having thus described my invention, what I claim to be new, and desire to secure by Letters Patent, is—

In a chicken-watering device, the combination with the reservoir having a tapering portion terminating in a neck, which is apertured about its circumference, the free end of the said neck having a flange, of the base portion having a series of elongated apertures therein, of the surrounding cylinder having a series of elongated apertures therein, and tapering tubes connecting the apertures in the outer cylinder and base portion, substantially as shown and described.

In testimony whereof I affix my signature in presence of two witnesses.

HARRY M. AMOS.

Witnesses:
  S. S. GUMP,
  JAMES F. MICKEL.